(12) United States Patent
Citriniti et al.

(10) Patent No.: US 11,698,017 B2
(45) Date of Patent: Jul. 11, 2023

(54) SYSTEM AND METHOD FOR DETECTING DEFECTS IN A HONEYCOMB BODY

(71) Applicant: CORNING INCORPORATED, Corning, NY (US)

(72) Inventors: Joseph Henry Citriniti, Corning, NY (US); En Hong, Painted Post, NY (US); Philip Robert LeBlanc, Corning, NY (US)

(73) Assignee: Corning Incorporated, Corning, NY (US)

( * ) Notice: Subject to any disclaimer, the term of this patent is extended or adjusted under 35 U.S.C. 154(b) by 270 days.

(21) Appl. No.: 17/261,672

(22) PCT Filed: Jul. 11, 2019

(86) PCT No.: PCT/US2019/041412
§ 371 (c)(1),
(2) Date: Jan. 20, 2021

(87) PCT Pub. No.: WO2020/018346
PCT Pub. Date: Jan. 23, 2020

(65) Prior Publication Data
US 2021/0262376 A1    Aug. 26, 2021

Related U.S. Application Data

(60) Provisional application No. 62/701,147, filed on Jul. 20, 2018.

(51) Int. Cl.
*F01N 11/00* (2006.01)
*B01D 46/24* (2006.01)
(Continued)

(52) U.S. Cl.
CPC ........ *F01N 11/002* (2013.01); *B01D 46/0086* (2013.01); *B01D 46/2418* (2013.01);
(Continued)

(58) Field of Classification Search
CPC ........ F01N 11/00; F01N 11/002; F01N 3/022; B01D 46/00; B01D 46/0086; B01D 46/24;
(Continued)

(56) References Cited

U.S. PATENT DOCUMENTS 4,483,944 A    11/1984    Day et al.
4,855,265 A    8/1989    Day et al.
(Continued)

FOREIGN PATENT DOCUMENTS

EP    1296125 A1    3/2003
JP    2012063349 A  *  3/2012  ......... B01D 46/0086
(Continued)

OTHER PUBLICATIONS

"Size measurement of dry ice particles produced from liquid carbon dioxide"; Elsevier Journal of Aerosol Science 48 (2012) 1-9; Liu et al. (Year: 2012).*
(Continued)

*Primary Examiner* — Nguyen Q. Ha
(74) *Attorney, Agent, or Firm* — Joseph M. Homa

(57) ABSTRACT

Defect detection systems include at least one nozzle for delivering a $CO_2$ particulate fluid to an inlet end of a plugged honeycomb body. Defects in the honeycomb, if any, are determined by monitoring $CO_2$ particulate flow at the outlet end of the honeycomb body. Methods for detecting defects in plugged honeycomb bodies are also disclosed.

20 Claims, 3 Drawing Sheets

(51) Int. Cl.
*G01N 15/06* (2006.01)
*G01N 15/08* (2006.01)
*B01D 46/00* (2022.01)
*C04B 38/00* (2006.01)
*F01N 3/022* (2006.01)

(52) U.S. Cl.
CPC .......... *C04B 38/0012* (2013.01); *F01N 3/022* (2013.01); *G01N 15/0826* (2013.01); *B01D 2279/30* (2013.01); *G01N 2015/084* (2013.01)

(58) Field of Classification Search
CPC ............ B01D 46/2418; B01D 2279/30; C04B 38/0012; G01N 15/00; G01N 15/06; G01N 15/08; G01N 15/0826; G01N 21/17; G01N 21/47; G01N 2015/084
See application file for complete search history.

(56) References Cited

U.S. PATENT DOCUMENTS

| | | | |
|---|---|---|---|
| 5,290,739 A | 3/1994 | Hickman | |
| 6,620,751 B1 | 9/2003 | Ogunwumi | |
| 6,666,070 B1 | 12/2003 | Hagg et al. | |
| 6,849,181 B2 | 2/2005 | Ogunwumi et al. | |
| 6,942,713 B2 | 9/2005 | Ogunwumi et al. | |
| 7,001,861 B2 | 2/2006 | Beall et al. | |
| 7,259,120 B2 | 8/2007 | Ellison et al. | |
| 7,294,164 B2 | 11/2007 | Merkel | |
| 7,410,528 B2 | 8/2008 | Rae et al. | |
| 7,520,918 B2 | 4/2009 | Zoeller, III | |
| 7,614,304 B2 | 11/2009 | Gunasekaran et al. | |
| 7,648,549 B2 | 1/2010 | Gargano et al. | |
| 7,674,309 B2 | 3/2010 | Gargano et al. | |
| 7,704,296 B2 | 4/2010 | Merkel | |
| 8,051,703 B2 * | 11/2011 | Poff | B01D 46/2418 73/37 |
| 2004/0020846 A1 | 2/2004 | Ogunwumi et al. | |
| 2004/0092381 A1 | 5/2004 | Beall et al. | |
| 2006/0151926 A1 | 7/2006 | Zoeller | |
| 2007/0022724 A1* | 2/2007 | Gargano | B01D 46/2418 55/523 |
| 2007/0238191 A1 | 10/2007 | Gargano et al. | |
| 2008/0173071 A1 | 7/2008 | Park et al. | |
| 2009/0220736 A1 | 9/2009 | Merkel | |

FOREIGN PATENT DOCUMENTS

| | | |
|---|---|---|
| WO | 2004/011386 A1 | 2/2004 |
| WO | 2005/046840 A1 | 5/2005 |
| WO | 2006/015240 A2 | 2/2006 |
| WO | 2012/124773 A1 | 9/2012 |

OTHER PUBLICATIONS

International Search Report and Written Opinion of the International Searching Authority; PCT/US19/41412; dated Sep. 11, 2019; 8 Pages; European Patent Office.

* cited by examiner

SYSTEM AND METHOD FOR DETECTING DEFECTS IN A HONEYCOMB BODY

This is a national stage application under 35 U.S.C. § 371 of International Application No. PCT/US2019/041412, filed on Jul. 11, 2019, which claims the benefit of priority under 35 U.S.C. § 119 of U.S. Provisional Application Ser. No. 62/701,147 filed on Jul. 20, 2018, the content of which is incorporated herein by reference in its entirety.

FIELD OF THE DISCLOSURE

The disclosure relates generally to methods and systems for detecting defects in a honeycomb body. More particularly, the disclosure relates to methods for detecting defects in plugged honeycomb bodies such as for a diesel particulate filter or a gasoline particulate filter using a fluid stream comprising carbon dioxide particulates and systems for carrying out such methods.

BACKGROUND

Honeycomb bodies, such as ceramic honeycombs, may be used in a variety of applications. For example, plugged honeycomb bodies may be useful as filtration articles, e.g., catalytic converters and particulate filters, such as diesel particulate filters (DPFs) or gasoline particulate filters (GPFs), which can be utilized to remove pollutants and/or particulates from fluid streams. Exemplary fluid streams may comprise gases, vapors, or liquids, and the particulates may comprise a separate phase in the fluid, such as solid particulates in a gas or liquid stream, or droplets of liquid in a gas stream, and the like. Particulates can include soot, ash, dust, aerosolized liquids, and any other variety of particulate contaminant present in any given fluid. Pollutants can include toxic gases or liquids, e.g., carbon monoxide, unburned hydrocarbon fuel, and the like. When particulates flow through the channels and walls of the honeycomb, a portion of the particulates in the fluid stream can be retained on or in the porous walls.

The filtration efficiency of the plugged honeycomb body is related to the effectiveness of the walls in removing the particulates from the fluid to be filtered. Filtration efficiency can be compromised by defects in the honeycomb, such as defects produced during manufacture and/or handling of the honeycomb. Exemplary defects can include holes, cracks, and/or fissures. Such defects can allow the fluid to pass through the honeycomb body without adequate filtration, resulting in a filtered fluid have an unacceptably high level of particulates. Thus, it may be desirable to test the plugged honeycomb bodies for the presence of defects that can negatively impact filtration efficiency. Honeycombs with detected defects can be repaired or discarded as appropriate.

SUMMARY

The disclosure relates, in various embodiments, to systems for detecting defects in a plugged honeycomb body, the systems comprising a $CO_2$ particulate source; at least one nozzle in fluid connection with the $CO_2$ particulate source, the at least one nozzle delivering a fluid stream comprising $CO_2$ particulates to an inlet end of the honeycomb body; and a detection system for monitoring $CO_2$ particulates in a filtered fluid stream exiting an outlet end of the honeycomb body. Also disclosed herein are methods for detecting defects in a plugged honeycomb body, the methods comprising delivering a fluid stream comprising $CO_2$ particulates to an inlet end of the honeycomb body, wherein the fluid stream flows through at least one channel of the honeycomb body and exits the honeycomb body through an outlet end; and detecting $CO_2$ particulates in a filtered fluid stream exiting the outlet end of the honeycomb body with a detection system comprising a light source and/or imaging device.

According to various embodiments, the $CO_2$ particulates can have an average particle size ranging from about 1 micron to about 100 microns. In additional embodiments, the fluid stream can comprise $CO_2$ particulates in a concentration ranging from about 1% to about 70% by volume. In further embodiments, the fluid stream comprising $CO_2$ particulates can have a flow velocity ranging from about 0.1 m/s to about 100 m/s. The system can comprise a conversion device in fluid connection with the $CO_2$ particulate source for generating $CO_2$ particulates from a liquid $CO_2$ source according to various embodiments. The conversion device can comprise, for instance, at least one of an operating temperature ranging from about −25° C. to about 25° C. and an operating pressure ranging from about 100 psi to about 1000 psi.

The at least one nozzle may, in various embodiments, comprise a blade delivering the fluid stream in a planar sheet aligned with one or more inlet channels of the honeycomb body. In some embodiments, the honeycomb body may be translated relative to the at least one nozzle during delivery of the fluid stream. For example, a conveying device can move the honeycomb body through a testing zone of the system. According to other embodiments, the at least one nozzle can comprise a cone diffuser delivering the fluid stream in a diffuse cloud covering substantially all of the inlet end of the honeycomb body. The detection system can, for example, comprise at least one light source for illuminating $CO_2$ particulates in a filtered fluid stream exiting the outlet end of the honeycomb body, e.g., the light source can produce at least one plane of light. In additional embodiments, the detection system can comprise an imaging device for imaging illuminated $CO_2$ particulates in the filtered fluid stream exiting the outlet end of the honeycomb body. According to some embodiments, a $CO_2$ particulate stream detected at the outlet end can correspond to defects in the plugged honeycomb body.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims.

BRIEF DESCRIPTION OF THE DRAWINGS

The following detailed description can be further understood when read in conjunction with the following drawings, which are not drawn to scale, and in which.

DETAILED DESCRIPTION

Figure 1:
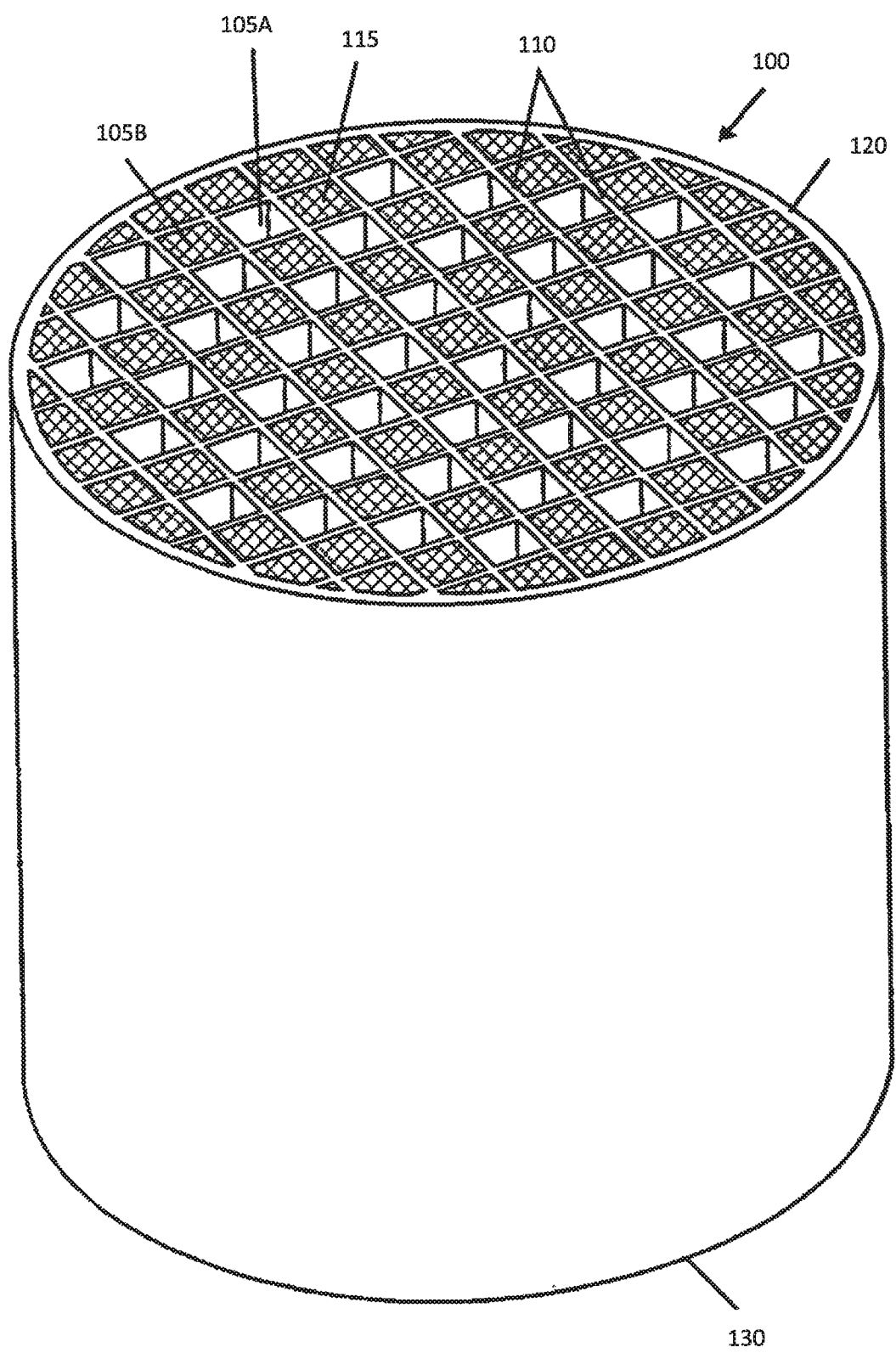
FIG. 1 illustrates an exemplary plugged honeycomb structure.

Various embodiments of the disclosure will now be discussed with reference to FIGS. 1 and 2A-B, which illustrate exemplary honeycomb bodies, defect detection systems, components thereof, and aspects thereof. The following general description is intended to provide an overview of the claimed devices, and various aspects will be more specifically discussed throughout the disclosure with reference to the non-limiting depicted embodiments, these embodiments being interchangeable with one another within the context of the disclosure.

Plugged Honeycomb Bodies

Honeycomb bodies disclosed herein can comprise a plurality of parallel channels or cells. The cellular geometry of the plugged honeycomb configuration is often used for filtration due to its high surface area per unit volume for increased deposition of particulate matter. Such a plugged honeycomb body 100 comprising a plurality of channels is illustrated in FIG. 1. The plugged honeycomb body 100 can comprise an inlet end face 120, an outlet end face 130, and a plurality of interior walls 110 separating and defining a plurality of inlet and outlet channels 105A, 105B. Additionally, as depicted in FIG. 1B, one or more of the channels 105A, 105B can comprise plugs 115, which can be used to direct or increase fluid flow through the interior channel walls 110. Plugs 115 can be inserted at the ends of the outlet cells 105B where they adjoin the inlet end face 120. Although not visible in FIG. 1, plugs may also be inserted at the ends of the inlet cells 105A where they adjoin the outlet end face 130. The outlet cells 105B ay thus be open where they adjoin the outlet end face 130 and the inlet cells 105A may be open where they adjoin the inlet end face 120. In some embodiments, alternating channels can be plugged and unplugged, e.g., to form a checkerboard pattern. In additional embodiments, each inlet cell 105A can be bordered on all sides by outlet cells 105B, and vice versa.

The honeycomb structure depicted in FIG. 1 is exemplary only and is not to be construed as limiting in any manner on the appended claims. For example, while the plugged honeycomb 100 is depicted with channels 105 having a substantially square cross-section, it is to be understood that the channels can have any suitable geometry, for example, circular, square, triangular, rectangular, hexagonal, or sinusoidal cross-sections, or any combination thereof. Additionally, although the plugged honeycomb 100 is depicted as substantially cylindrical in shape, it is to be understand that such shape is exemplary only and the porous ceramic structure can have any variety of shapes including, but not limited to, spherical, oblong, pyramidal, cubic, or block shapes, to name a few. Furthermore, while the specific channels 105 are indicated as comprising plugs 115, it is to be understood that the plugs may be arranged in any given fashion, e.g. alternating fashion or any other arrangement, as appropriate for a desired fluid flow pattern and/or pressure drop.

In certain embodiments, a plugged honeycomb structure may be installed in a housing as a particulate filter, which may then be inserted into the exhaust system of a vehicle equipped with, for example, a diesel engine or a gasoline engine. In operation, engine exhaust directed at the inlet face 120 of the plugged honeycomb body 100 flows into the inlet cells 105A. The interconnected porous walls 110 are provided with an internal interconnected open porosity that allows the exhaust to pass from the inlet cells 105A to the outlet cells 105B while restraining a desired portion of the solid particulates in the exhaust. The filtered exhaust exits the outlet face 130 of the plugged honeycomb body through the outlet cells 105B.

Honeycomb bodies are often described in terms of cells (or channels) per square inch of surface area, as well as interior wall thickness (which may be reported in mils or $10^{-3}$ inches or thousandths of an inch). For example, a honeycomb body comprising 300 cells/in$^2$ and a wall thickness of 0.008 inches would be labeled as a 300/8 honeycomb, and so forth. Exemplary honeycomb bodies may comprise from about 100 to about 500 cells/in$^2$ (15.5-77.5 cells/cm$^2$), such as from about 150 to about 400 cells/in$^2$ (23.25-62 cells/cm$^2$), or from about 200 to about 300 cells/in$^2$ (31-46.5 cells/cm$^2$), including all ranges and subranges therebetween. According to additional embodiments, the interior wall thickness can range from about 0.005 to about 0.02 inches (127-508 microns), such as from about 0.006 to about 0.015 inches (152-381 microns), from about 0.007 to about 0.012 inches (177-305 microns), or from about 0.008 to about 0.01 inches (203-254 microns), e.g., about $5\times10^{-3}$, $6\times10^{-3}$, $7\times10^{-3}$, $8\times10^{-3}$, $9\times10^{-3}$, $10\times10^{-3}$, $12\times10^{-3}$, $14\times10^{-3}$, $16\times10^{-3}$, $18\times10^{-3}$, or $20\times10^{-3}$ inches, including all ranges and subranges therebetween.

In some embodiments, honeycomb lengths and/or diameters can range from one to several inches, such as from about 1 inch to about 12 inches (2.54-30.48 cm), from about 2 inches to about 11 inches (5.08-27.94 cm), from about 3 inches to about 10 inches (7.62-25.4 cm), from about 4 inches to about 9 inches (10.16-22.86 cm), from about 5 inches to about 8 inches (12.7-20.32 cm), or from about 6 inches to about 7 inches (15.24-17.78 cm), including all ranges and subranges therebetween. The total volume of such honeycomb bodies can range, in some embodiments, from about 0.1 L to about 20 L, such as from about 0.5 L to about 18 L, from about 1 L to about 16 L, from about 2 L to about 14 L, from about 3 L to about 12 L, from about 4 L to about 10 L, or from about 5 L to about 8 L, including all ranges and subranges therebetween.

In some embodiments, the honeycomb body can comprise a porous structure (or microstructure). A "porous" body as disclosed herein can comprise a porosity, in some embodiments, of at least about 40%, such as about 45%, 50%, 55%, 60%, 65%, 70%, 75%, 80%, 85%, or greater. The honeycomb body is not limited in shape, size, pore size, pore distribution, and/or pore number. The honeycomb body may, in certain embodiments, comprise an outer skin and an interior core. For example, the outer skin can form a porous outer surface of the filter and the interior core can comprise walls defining a porous microstructure (e.g., a plurality of channels). The material forming the outer skin and interior walls may be the same or different and, in some embodiments, the outer skin may have a thickness different than the interior wall thickness. The outer skin may, in some embodiments, have a porosity different than that of the interior walls, e.g., can be made of a different material or can be made of the same material with a higher or lower porosity. In various exemplary embodiments, the skin may be extruded and/or molded together with the core of the honeycomb. In other exemplary embodiments, the skin may be a separate structure wrapped around the outside of the core and fired together with the core to create a ceramic structure.

According to certain non-limiting embodiments, the honeycomb body is comprised of walls of a porous ceramic material having a median pore size ($d_{50}$) of less than about 30 microns, such as ranging from about 8 microns to about 30 microns, from about 10 microns to about 25 microns, or from about 15 microns to about 20 microns, including all ranges and subranges in between, e.g., about 8, 9, 10, 11, 12, 13, 14, 15, 16, 17, 18, 19, 20, 21, 22, 23, 24, 25, 26, 27, 28, 29, or 30 microns. For instance, the $d_{50}$ value can range from about 12 microns to about 23 microns, such as from about 13 microns to about 22 microns, from about 14 microns to about 21 microns, from about 15 microns to about 20 microns, from about 16 microns to about 19 microns, or from about 17 microns to about 18 microns, including all ranges and subranges therebetween. As used herein, porosity and pore sizes such as median pore sizes can be measured via mercury porosimetry.

Additionally, in some embodiments, it may be desirable to limit the number of larger pores in the walls of the honeycomb body, e.g., such that pores greater than 30 microns make up less than about 10% of the total porosity ($d_{90}$=30 microns). For example, pores greater than 30 microns may make up less than about 8%, less than about 5%, or less than about 2% of the total porosity. In various embodiments, the $d_{90}$ value can range from about 20 microns to about 50 microns, such as from about 25 microns to about 40 microns, or from about 30 microns to about 35 microns, including all ranges and subranges therebetween. Similarly, according to certain embodiments, it may be desirable to limit the number of smaller pores in the walls of the honeycomb body, e.g., such that pores less than 5 microns make up less than about 10% of the total porosity ($d_{10}$=5 microns). For example, pores smaller than 5 microns may make up less than about 8%, less than about 5%, or less than about 2% of the total porosity. In various embodiments, the $d_{10}$ value can range from about 3 microns to about 15 microns, such as from about 4 microns to about 14 microns, from about 5 microns to about 12 microns, from about 6 microns to about 11 microns, from about 7 microns to about 10 microns, or from about 8 microns to about 9 microns, including all ranges and subranges therebetween.

The honeycomb bodies disclosed herein can comprise any suitable materials, such as ceramic, paper, polymer, glass, activated carbon, graphite, charcoal, organic char, composites thereof, and combinations thereof. In certain embodiments, the honeycomb body can be formed from a green ceramic batch mixture, e.g., a mixture comprising inorganic batch components capable of being formed into a green ceramic or ceramic-forming body, which can then be fired into a ceramic body. The green ceramic batch mixture may comprise one or more ceramic components, and/or one or more components which are capable of forming a ceramic phase or ceramic material. The batch mixture may comprise a mixture of inorganic batch components and additional components, such as a binder, solvent, lubricant, surfactant, pore former, and/or any other desired additive. Green ceramic batch-forming materials may have any suitable composition, e.g., as desired for a filtration application or any other application. Exemplary ceramic compositions include, but are not limited to, cordierite, aluminum titanate, silicon carbide, silicon nitride, calcium aluminate, zirconium phosphate, eucryptite, spudomene, mullite, feldspar, and the like. As such, in some embodiments, the green ceramic batch mixture may be a cordierite-forming batch mixture, an aluminum-titanate-forming batch mixture, and so forth, without limitation.

Inorganic batch components making up the green ceramic batch mixture may comprise one or more inorganic oxides or precursors thereof, collectively referred to herein as "source" materials. Sources may include, but are not limited to, materials that, when heated to a given temperature, alone or in the presence of other materials, will yield an inorganic oxide. In various non-limiting embodiments of the disclosure, inorganic batch components may comprise at least one source of alumina, silica, magnesia, titania, and/or other inorganic oxides (e.g., lanthanum, yttrium, barium, sodium, potassium, lithium, calcium, strontium, iron, boron, and phosphorous oxides), as well as other inorganic compounds such as carbonates, nitrates, and hydroxides (e.g., calcium and strontium carbonate). The green ceramic batch mixture may, in some embodiments, further comprise at least one additional inorganic oxide, carbonate, nitrate, or hydroxide, such as lanthanum, yttrium, barium, sodium, potassium, lithium, calcium, strontium, iron, boron, and phosphorous oxides, carbonates, nitrates, and/or hydroxides. One or more multi-source inorganic compounds may also be included in the green ceramic batch mixture, e.g., a compound comprising more than one type of oxide or precursor thereof, such as kaolin.

In various embodiments, the inorganic batch components may be chosen such that the green ceramic batch mixture forms and/or comprises cordierite, aluminum titanate, silicon carbide, silicon nitride, calcium aluminate, zirconium phosphate, eucryptite, spudomene, mullite, and feldspar ceramic bodies. Thus, one or more inorganic components may have the same composition as the final fired composition, for example an inorganic component may be silicon carbide wherein silicon carbide particles bond, agglomerate, or sinter to one another resulting in a silicon carbide final ceramic body; or, one of the inorganic components may be cordierite wherein the final fired ceramic article comprises cordierite. Instead, or in addition, the inorganic components may comprise two or more inorganic components which react with each other in a solid phase reaction to result in a final fired composition which is different from either of the inorganic components, for example alumina and silica can be provided as inorganic components and the final fired ceramic composition may be cordierite or aluminum titanate or other composition. In at least one embodiment, the green ceramic batch mixture may form an aluminum titanate ceramic body.

For instance, the stoichiometry of the inorganic batch components may be chosen to produce a ceramic composition comprising about 45-55 wt % alumina, about 25-35 wt % titania, and about 5-15 wt % silica. Exemplary aluminum titanate batch mixtures and the preparation thereof are described in U.S. Pat. Nos. 4,483,944, 4,855,265, 5,290,739, 6,620,751, 6,942,713, 6,849,181, 7,001,861, 7,259,120, and 7,294,164; U.S. Patent Application Publication Nos. 2004/0020846 and 2004/0092381; and International Patent Application Publication Nos. WO 2006/015240, WO 2005/046840, and WO 2004/011386, all of which are incorporated herein by reference in their entireties.

According to certain embodiments, the green ceramic batch mixture may form a cordierite-forming green ceramic body, which may then be fired into a cordierite ceramic body. For instance, the stoichiometry of the inorganic batch components may be chosen to produce a ceramic composition comprising about 35-60 wt % silica, about 25-50 wt % alumina, and about 5-25 wt % magnesia. Exemplary cordierite batch mixtures and the preparation thereof are described in U.S. Pat. No. 7,704,296 and U.S. Patent Application Publication No. 2009/0220736, both of which are incorporated herein by reference in their entireties. The cordierite green ceramic composition may, in various exemplary embodiments, comprise clay or may, in other embodiments, be substantially free of clay. For example, the cordierite batch mixtures may comprise less than about 1% by weight of clay, for example, less than about 0.5% by weight of clay, or less than about 0.1% by weight of clay.

The batch materials may be mixed using any suitable method known in the art. In various embodiments, the inorganic batch components may comprise dry powders, which can be mixed to form a substantially homogeneous dry mixture. For example, the inorganic batch components may be pre-combined to form a substantially dry mixture and may be subsequently wet and/or plasticized by the addition of one or more of a lubricant, solvent, binder, and/or emulsifier. Optionally, the at least one pore former may also be blended with the inorganic batch components to form a dry mixture. According to certain non-limiting embodiments, all wet and dry batch materials may be mixed together, in any order or sub-combination, to form a green ceramic batch mixture. The individual components of the green ceramic batch mixture, regardless of the order of addition, may be mixed to form a substantially homogeneous mixture. By way of non-limiting example, the batch materials may be mixed or kneaded, e.g., using a ribbon mixer, twin-screw extruder/mixer, auger mixer, muller mixer, or double-arm mixer.

The green ceramic batch mixture may then be extruded to form a green ceramic body, such as a self-supporting green ceramic body. For instance, the green ceramic batch mixture may be extruded, e.g., vertically or horizontally, using a hydraulic ram extrusion press, a single auger extruder, or a twin-screw mixer, with a die assembly attached to the discharge end. According to various embodiments, the green ceramic batch mixture may be extruded to form a ceramic green body comprising a honeycomb configuration comprising a plurality of walls forming channels having one or more desired channel shapes, wall thicknesses, and/or cell densities.

As used herein, the term "green body" and variations thereof is intended to denote an unfired and, in some embodiments, an unreacted precursor composition or mixture, which can be extruded and, in various embodiments, can result in a self-standing green body after extrusion, such as is obtained by the mixture being plasticized. The green body may be dried and, in some embodiments, has not undergone calcination, sintering, or any other reactive process. In certain embodiments, the green body may optionally be dried using air drying, hot-air drying, dielectric drying, microwave drying, vacuum drying, or freeze drying. In contrast, a "fired" or "sintered" ceramic body and variations thereof is intended to denote a ceramic body that has undergone firing in conditions effective to convert the batch mixture into a final ceramic composition. The ceramic body may also undergo calcination during the firing process.

The green body may, in some embodiments, be fired to form a ceramic body. It is within the ability of those skilled in the art to determine the appropriate methods and parameters for forming the desired ceramic body, such as firing conditions including equipment, temperature, and duration. Such methods and conditions may depend, for example, on the size, geometry, and composition of the green body, as well as the desired properties of the ceramic body. By way of non-limiting example, firing may occur at a temperature ranging from about 1200° C. to about 1600° C., such as from about 1250° C. to about 1500° C., from about 1300° C. to about 1450° C., or from about 1350° C. to about 1400° C., including all ranges and subranges therebetween. Exemplary firing times may range from about 1 hour to about 200 hours, such as from about 2 hours to about 100 hours, from about 3 hours to about 50 hours, from about 5 hours to about 25 hours, or from about 10 hours to about 20 hours, including all ranges and subranges therebetween.

Optionally, the green ceramic body may be fired in a two-stage process, comprising a heating stage to burn out organic components such as the pore former, binder, surfactant, oil, and/or emulsifier. For instance, the binder may have a combustion temperature ranging from about 200° C. to about 300° C. and the pore former may have a combustion temperature ranging from about 300° C. to about 1000° C. During the heating stage, the green ceramic may be exposed to a temperature ranging from about 200° C. to about 1000° C., such as from about 300° C. to about 800° C., from about 400° C. to about 700° C., or from about 500° C. to about 600° C., including all ranges and subranges therebetween.

The green batch mixtures disclosed herein may be utilized to form a honeycomb body of a desired shape and/or dimension. In various embodiments, the honeycomb body is preferably formed or extruded as a monolithic structure, for example, via extruding and/or molding techniques, or in other embodiments by bonding segment structures together. Those having ordinary skill in the art are familiar with the various techniques for forming such ceramic monolithic structures. The green ceramic body may be subsequently fired to produce a fired ceramic body having the desired honeycomb shape and composition.

Detection Systems

Disclosed herein are systems for detecting defects in a plugged honeycomb body, the systems comprising a $CO_2$ particulate source; at least one nozzle in fluid connection with the $CO_2$ particulate source, the at least one nozzle delivering a fluid stream comprising $CO_2$ particulates to an inlet end of the honeycomb body; and a detection system for monitoring $CO_2$ particulates in a filtered fluid stream exiting an outlet end of the plugged honeycomb body. As used herein, the term "defect" is intended to denote a hole, crack, or gap in a channel wall and/or plug. Such defects can allow for unfiltered fluid flow through the plugged honeycomb body.

Figure 2A:
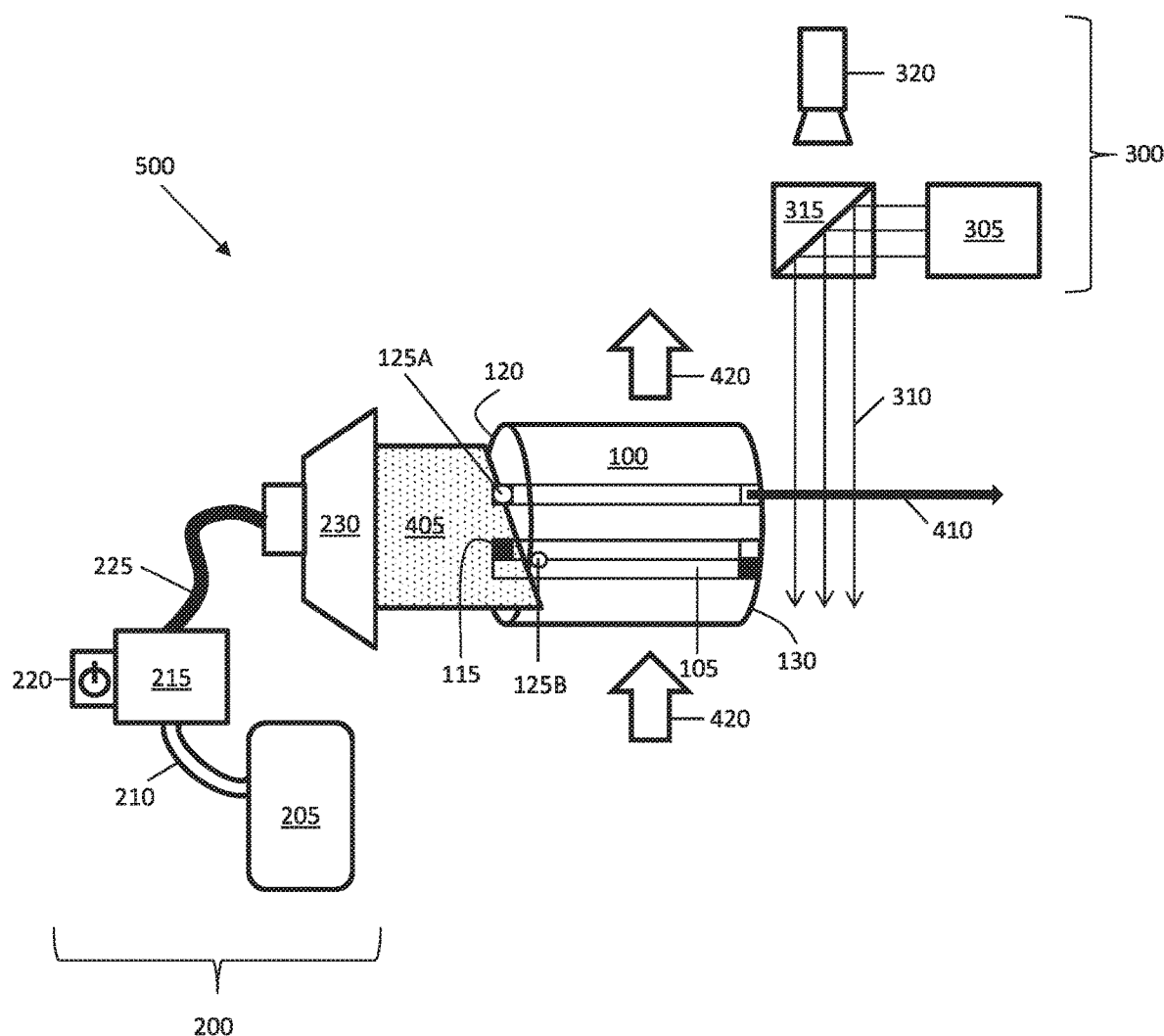
FIGS. 2A-B illustrate exemplary defect detection systems according to various embodiments of the disclosure.
Figure 2B:
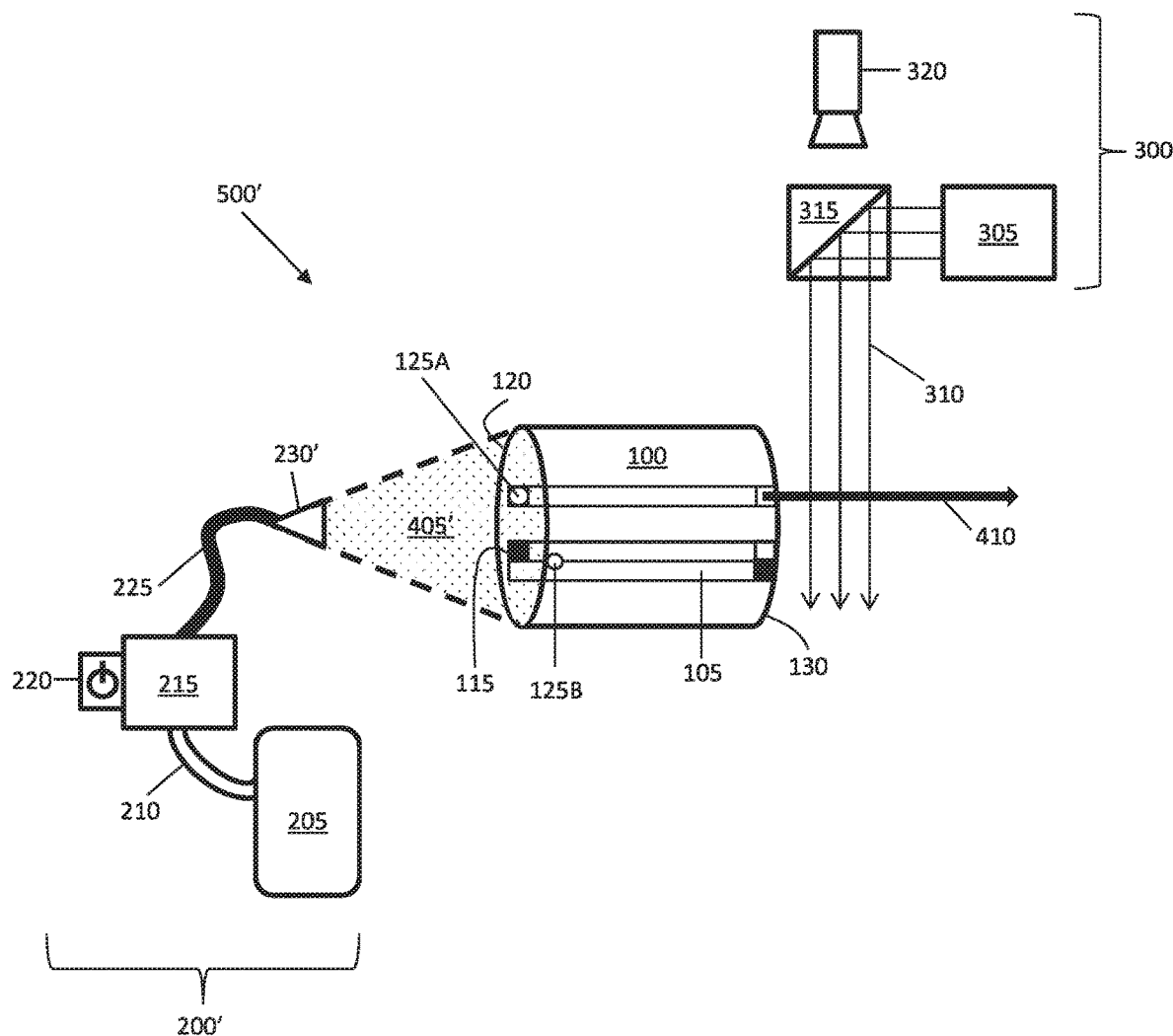

FIG. 2A depicts an exemplary system 500 for detecting defects in a plugged honeycomb body 100 according to embodiments of the disclosure. The system 500 can include a particulate production device 200, which can include, for example, a fluid source 205, a fluid delivery conduit 210, a conversion apparatus 215, which can include a control cabinet 220, a particulate delivery conduit 225, and a particulate dispensing nozzle such as a blade 230; and a particulate detection device 300, which can include, for instance, a light source 305, a beam splitter 315, and an imaging device 320. FIG. 2B similarly depicts an exemplary system 500' comprising a particulate production device 200' including a fluid dispensing nozzle such as a cone diffuser 230'. The systems 500 and 500' are described in more detail below.

Particulate production systems 200 and 200' can be used to convert the fluid source 205, such as liquid carbon dioxide, to a particulate stream 405 or diffuse particulate stream 405', such as a stream comprising solid carbon dioxide particulates, e.g., carbon dioxide snow or dry ice particulates. The fluid source 205 can be contained in a reservoir such as a tank or vat and can travel to the conversion apparatus 215 via the fluid delivery conduit 210, which can be a pipe or a hose in some embodiments. The fluid delivery conduit 210 may, in various embodiments, be thermally insulated. The conversion apparatus 215 can include a control cabinet 220, which can be used to vary the conditions within the conversion apparatus 215, such as temperature and/or pressure, mixing compressed gas condition, and/or the flow rates into and/or out of the apparatus. The fluid delivered to the conversion apparatus 215 can be converted to a particulate stream 405 or 405' by subjecting the fluid source 205 to an elevated pressure and/or lowered temperature.

For example, fluid from the fluid source 205 can be cooled to a temperature below room temperature (about 25° C.), such as below about 20° C., below about 10° C., below about 0° C., below about −10° C., below about −20° C., or below about −25° C., including all ranges or subranges therebetween, e.g., ranging from about −25° C. to about 25° C. The fluid can additionally or alternatively be pressurized to a pressure greater than about 200 psi, such as greater than about 300 psi, greater than about 400 psi, greater than about 500 psi, greater than about 600 psi, greater than about 700 psi, greater than about 800 psi, greater than about 900 psi, or greater than about 1000 psi, including all ranges and subranges therebetween, e.g., ranging from about 200 psi to about 1000 psi. In some embodiments, the conversion apparatus 215 can operate at a temperature ranging from about −25° C. to about 0° C. and a pressure ranging from about 230 psi to about 490 psi. In other embodiments, the conversion apparatus 215 can operate at a temperature ranging from about 0° C. to about 25° C. and a pressure ranging from about 490 psi to about 918 psi.

$CO_2$ particulates produced by the conversion apparatus 215 can be dispersed in a gas, such as air or an inert gas such as nitrogen or argon, and transferred via a particulate delivery conduit 225, such as a hose or pipe, to the particulate dispensing nozzle, e.g., a blade 230 or cone diffuser 230'. The particulate dispensing nozzle can deliver the fluid stream 405 or 405' to an inlet end 120 of the plugged honeycomb body 100. In certain embodiments, as depicted in FIG. 2A, the particulate dispensing blade 230 can comprise a flat nozzle capable of collimating the particulate stream 405 into a substantially planar sheet aligned with one or more channels 105 of the plugged honeycomb body 100. For instance, the particulate stream 405 may be delivered to one or more horizontal rows of channels 105 of the plugged honeycomb body 100 as depicted in FIG. 2A, or it may be delivered to one or more vertical columns of channels (not depicted) or any suitable combination of rows and columns. In other embodiments, as depicted in FIG. 2B, the particulate cone diffuser 230' can diffuse the $CO_2$ particulates, e.g., in air, to produce a diffuse particulate stream 405', such as a diffuse cloud or fog, covering substantially all of the inlet end 120 of the plugged honeycomb body.

In certain embodiments, the plugged honeycomb body 100 may be translated relative to the particulate dispensing blade 230 in any suitable direction, e.g., in the direction indicated by arrows 420, which are pointing in a non-limiting arbitrary direction, such that the particulate stream 405 is delivered sequentially to one or more rows and/or columns of channels 105 of the plugged honeycomb body. Alternatively, the particulate dispensing blade 230 may be translated relative to a stationary plugged honeycomb body 100 to achieve sequential delivery of the fluid stream 405. In further embodiments, the honeycomb body 100 and/or particulate cone diffuser 405' may not be translated relative to one another, although conveyance of one or more of these components in any direction during particulate stream delivery is also possible. In certain embodiments, the system can further include a device for securing the honeycomb filter, such as a mounting fixture, and/or a device for transporting the filter, e.g., a conveyor belt. One or more of these components can be used to move the honeycomb body through a testing zone of the system, e.g., positioning the inlet end of the honeycomb body proximate the particulate stream and the outlet end proximate the particulate detection device.

A concentration of $CO_2$ particulates in the particulate stream 405 or 405' can be greater than about 1% by volume, such as greater than about 5% by volume, greater than about 10% by volume, greater than about 20% by volume, greater than about 30% by volume, greater than about 40% by volume, greater than about 50% by volume, greater than about 60% by volume, or greater than about 70% by volume, including all ranges and subranges therebetween, such as ranging from about 1% to about 70% by volume. In some embodiments, the particulate stream 405 can comprise a particulate concentration ranging from about 30% to about 70% by volume. In additional embodiments, the diffuse particulate stream 405' can comprise a particulate concentration ranging from about 1% to about 50% by volume. According to various embodiments, the $CO_2$ particulates in the particulate stream 405 or 405' can have an average particle size ranging from about 1 micron to about 100 microns, such as from about 5 microns to about 90 microns, from about 10 microns to about 80 microns, from about 20 microns to about 70 microns, from about 30 microns to about 60 microns, or from about 40 microns to about 50 microns. In certain embodiments, the $CO_2$ particulates can have an average particle size ranging from about 1 micron to about 10 microns, such as from about 2 microns to about 9 microns, from about 3 microns to about 8 microns, from about 4 microns to about 7 microns, or from about 5 microns to about 6 microns, including all ranges and subranges therebetween.

The velocity of particulate stream 405 or 405' exiting the particulate dispensing blade 230 and/or cone diffuser 230' can vary depending upon the desired application by may, in some embodiments, range from about 0.1 m/s to about 100 m/s, such as from about 0.5 m/s to about 90 m/s, from about 1 m/s to about 80 m/s, from about 5 m/s to about 70 m/s, from about 10 m/s to about 60 m/s, from about 20 m/s to about 50 m/s, or from about 30 m/s to about 40 m/s, including all ranges and subranges therebetween. According to various embodiments, the control cabinet 220 of the conversion apparatus 215 can control and vary the flow rates into and/or out of the conversion apparatus 215. For instance, a lower fluid flow rate into the conversion apparatus 215 may result in a particulate stream with a higher concentration of $CO_2$ particulates and a lower velocity exiting the particulate dispensing nozzle. Conversely, a higher fluid flow rate into the conversion apparatus 215 may result in a particulate stream with a lower concentration of $CO_2$ particulates and a higher velocity exiting the particulate dispensing nozzle. It is within the ability of one skilled in the art to vary the conversion apparatus conditions and/or flow rates as appropriate to achieve a desired analytical result.

The particulate stream 405 or 405 can be delivered to the inlet end 120 of the honeycomb body 100 and may travel through at least one channel 105 to the outlet end 130 of the honeycomb body 100. As discussed above with reference to FIG. 1, one or more inlet channels 105A may be plugged at the outlet end 130 and one or more outlet channels 105B may be plugged at the inlet end 120 by plugs 115 to direct or increase fluid flow through the interior channel walls. However, defects in the channels 105 and/or plugs 115 may negatively impact the desired fluid flow through the plugged honeycomb body 100, thereby allowing particulates to bypass the filtering features of the channel walls and proceed to the outlet end 130 of the plugged honeycomb body 100.

For instance, a plug defect 125A such as a hole or crack in the plug 115 or an incompletely filled plug may allow a fluid stream to flow straight through a channel 105 without flowing through one or more interior channel walls to remove particulates from the fluid stream. Alternatively, a channel defect 125B can allow for unfiltered fluid flow between adjacent channels 105. Channel defects can include a hole or crack in the interior channel wall, which can be formed due to batch irregularities or during extrusion and/or firing, e.g., during organic burnout. As illustrated in FIGS. 2A-B, a defect can result in a particulate defect stream 410 exiting the outlet end 130 of the plugged honeycomb body, the defect stream comprising $CO_2$ particulates that can be detected by the particulate detection device 300. The defect stream 410 may comprise a relatively higher concentration of particulates or the defect stream 410 may comprise relatively larger particulates due to agglomeration of particles inside the channel as compared to the filtered fluid stream exiting the outlet end 130. These size and/or concentration variations can be detected by the particulate detection device 300.

The particulate detection device 300 can include a light source 305, such as a laser, emitting light adjacent the outlet end 130 of the plugged honeycomb body 100. A beam splitter 315 can be used to convert light from the light source 305 into at least one planar sheet of light 310. The sheets of light 310 can span the outlet end 130 of the plugged honeycomb body 100 and can be substantially perpendicular to the outlet end 130. The distance between the sheets of light 310 and the outlet end 130 can be chosen to ensure particulates exiting the outlet end 130 have sufficient momentum to intersect the sheets of light 310 such that they become illuminated.

An imaging device 320 such as a camera can be positioned above the outlet end 130 of the plugged honeycomb body 100. The imaging device 320 can be used to take photographs or videos of illuminated particulates and/or reflected or scattered light as the particles intersect the sheets of light 310. Regions in the plugged honeycomb body 100 having defects can discharge more and/or larger $CO_2$ particulates. Thus, brighter spots in the captured image can correspond to defects in the plugged honeycomb body 100. In some embodiments, the size of the bright spots can provide an indication of the size of the defect(s) in the plugged honeycomb body 100. According to various embodiments, imaging and illumination can be coaxial, e.g., the particles can be illuminated and imaged along the same axis. Alternatively, imaging and illumination may be non-coaxial, e.g., imaging and illumination are carried out along different axes with an angular separation therebetween, which may be useful for accommodating installation space limitations. In further embodiments, the system can include one or more additional components for improving signal noise level, e.g., to correct the image background correction and or control light reflection along the detection axis. In still further embodiments, thermal imaging may be used, e.g., an infrared imaging device, which can be used with or without the light source.

Methods

Disclosed herein are methods for detecting defects in a plugged honeycomb body, the methods comprising delivering a fluid stream comprising $CO_2$ particulates to an inlet end of the honeycomb body, wherein the fluid stream flows through at least one channel of the honeycomb body and exits the honeycomb body through an outlet end; and detecting $CO_2$ particulates in a filtered fluid stream exiting the outlet end of the honeycomb body with a detection system comprising a light source and/or imaging device. The methods disclosed herein can be combined with any of the embodiments discussed above with respect to the detection systems, including average $CO_2$ particle size, $CO_2$ particulate concentrations, fluid stream flow velocity, and other like process variables.

The methods disclosed herein can further comprise generating $CO_2$ particulates from a liquid $CO_2$ source, e.g., using a conversion apparatus as described above. For example, the liquid $CO_2$ source can be delivered to the conversion apparatus and cooled to a temperature ranging from about $-25°$ C. to about $25°$ C. and/or pressurized to a pressure ranging from about 200 psi to about 1000 psi, such as from about 230 psi to about 918 psi. The $CO_2$ particulates can then be delivered to an inlet end of the honeycomb body in a fluid stream, e.g., using at least one particulate dispensing nozzle such as the particulate dispensing blade or particulate cone diffuser described above. In certain embodiments, the honeycomb body can be translated relative to the at least one nozzle during fluid stream delivery, or the nozzle(s) can be translated relative to the honeycomb body. In other embodiments, the honeycomb body and/or nozzle(s) may be stationary during delivery of the fluid stream.

During the detection methods disclosed herein, the fluid stream comprising $CO_2$ particulates can travel through the plugged honeycomb body, e.g., along one or more channels and passing through one or more interior channel walls, which can remove $CO_2$ particulates from the fluid stream to provide a filtered fluid stream. The filtered fluid stream exits the outlet end of the honeycomb body and may be analyzed using a detection system as described above. Detecting $CO_2$ particulates in the filtered fluid stream can comprise, for example, directing the filtered fluid stream through at least one plane of light to provide illuminated $CO_2$ particulates. The illuminated $CO_2$ particulates can also be imaged. In certain embodiments, the image(s) can be analyzed for bright regions, which may correspond to defects in the plugged honeycomb body.

The methods disclosed herein can be utilized in a continuous process to analyze multiple honeycomb bodies in sequence. For example, a conveyor belt or other transportation device can be used to sequentially convey a plurality of plugged honeycomb bodies through a testing zone of the system disclosed herein, e.g., positioning the inlet end of each honeycomb body proximate the particulate delivery nozzle and positioned the outlet end of each honeycomb body proximate the detection system.

The systems and methods disclosed herein may have one or more advantages over other systems and methods. For instance, systems employing a water vapor as the particulate stream can require wetting and/or preconditioning of the honeycomb body to be tested, which can increase the test time and/or cost. In contrast, the $CO_2$ particulate stream can be utilized without the need for preconditioning, which can decrease testing time, increase throughput, and/or decrease cost. Water vapor testing systems can also be adversely affected by ambient temperature and/or humidity. Water vapor systems can also have reduced accuracy when detecting defects near the outer edges of the honeycomb body. By comparison, the $CO_2$ particulate stream is more robust and can have wider application and/or higher accuracy. Additionally, the $CO_2$ particulate stream may be environmentally friendly, non-destructive to the honeycomb body, and substantially free of residue, as the $CO_2$ particulates will sublimate quickly upon reaching room temperature and pressure. Moreover, the $CO_2$ particulate stream can be generated at high pressure and/or speed such that it has improved sensitivity to smaller defects, such as small cracks and holes in the honeycomb body.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a channel" includes examples having one such "channel" or two or more such "channels" unless the context clearly indicates otherwise. Similarly, a "plurality" or an "array" is intended to denote two or more, such that an "array of channels" or a "plurality of channels" denotes two or more such channels.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 100 nm" and "a dimension less than about 100 nm" both include embodiments of "a dimension less than about 100 nm" as well as "a dimension less than 100 nm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A system for detecting defects in a plugged honeycomb body, comprising:
   a $CO_2$ particulate source;
   at least one nozzle in fluid connection with the $CO_2$ particulate source, the at least one nozzle delivering a fluid stream comprising $CO_2$ particulates to an inlet end of the plugged honeycomb body; and
   a detection system for monitoring $CO_2$ particulates in a filtered fluid stream exiting an outlet end of the plugged honeycomb body; and
   a conversion apparatus in fluid connection with the $CO_2$ particulate source, wherein the conversion apparatus generates $CO_2$ particulates from a liquid $CO_2$ source, wherein the conversion apparatus comprises at least one of an operating temperature ranging from about $-25°$ C. to about $25°$ C. and an operating pressure ranging from about 200 psi to about 1000 psi.

2. The system of claim 1, wherein the $CO_2$ particulates have an average particle size ranging from about 1 micron to about 100 microns.

3. The system of claim 1, wherein the fluid stream comprising $CO_2$ particulates has a particulate concentration ranging from about 1% to about 70% by volume as it exits the at least one nozzle.

4. The system of claim 1, wherein the fluid stream comprising $CO_2$ particulates has a flow velocity ranging from about 0.1 m/s to about 100 m/s as it exits the at least one nozzle.

5. The system of claim 1, wherein the at least one nozzle comprises a blade delivering the fluid stream in a planar sheet aligned with one or more channels of the plugged honeycomb body.

6. The system of claim 1, wherein the at least one nozzle comprises a cone diffuser delivering the fluid stream in a diffuse cloud covering substantially all of the inlet end of the plugged honeycomb body.

7. The system of claim 1, wherein the detection system comprises at least one light source for illuminating the fluid stream exiting the outlet end of the plugged honeycomb body.

8. The system of claim 7, wherein the detection system comprises an imaging device for imaging illuminated $CO_2$ particulates in the fluid stream exiting the outlet end of the plugged honeycomb body.

9. The system of claim 7, further including a beam splitter for converting light from the light source into at least one planar sheet of light.

10. A method for detecting defects in a plugged honeycomb body, comprising:
    delivering a fluid stream comprising $CO_2$ particulates to an inlet end of the honeycomb body, wherein the fluid stream flows through at least one channel of the honeycomb body and exits the honeycomb body through an outlet end; and
    detecting $CO_2$ particulates in a filtered fluid stream exiting the outlet end of the honeycomb body with a detection system comprising at least one of a light source and an imaging device;
    wherein $CO_2$ particulates are generated from a liquid $CO_2$ source: and
    wherein the method further comprises at least one of cooling the liquid $CO_2$ source to a temperature ranging from about $-25°$ C. to about $25°$ C. and pressurizing the liquid $CO_2$ source to a pressure ranging from about 200 psi to about 1000 psi.

11. The method of claim 10, wherein the $CO_2$ particulates comprise an average particle size ranging from about 1 micron to about 100 microns.

12. The method of claim 10, wherein the fluid stream comprising $CO_2$ particulates has a particulate concentration ranging from about 1% to about 70% by volume.

13. The method of claim 10, wherein the fluid stream comprising $CO_2$ particulates is delivered to the inlet end of the honeycomb body at a flow velocity ranging from about 0.1 m/s to about 100 m/s.

14. The method of claim 10, wherein the fluid stream comprising $CO_2$ particulates is delivered to the inlet end of the honeycomb body by at least one nozzle comprising a blade or cone diffuser.

15. The method of claim 14, wherein the fluid stream comprising $CO_2$ particulates is delivered to the inlet end as a planar sheet or diffuse cloud.

16. The method of claim 14, wherein the honeycomb body is translated relative to the at least one nozzle during delivery of the fluid stream comprising $CO_2$ particulates.

17. The method of claim 10, wherein detecting the $CO_2$ particulates comprises directing the filtered fluid stream exiting the outlet end of the honeycomb body through at least one plane of light to provide illuminated $CO_2$ particulates.

18. The method of claim 17, wherein detecting the $CO_2$ particulates comprises imaging the illuminated $CO_2$ particulates and identifying bright regions in the image corresponding to defects in the honeycomb body.

19. The method of claim 10, wherein the detection system comprises an infrared imaging device.

20. The method of claim 17, wherein the at least one plane of light comprises a plurality of planar sheets of light.

\* \* \* \* \*